United States Patent
Willert et al.

(10) Patent No.: US 9,521,836 B2
(45) Date of Patent: Dec. 20, 2016

(54) SCENT-RELEASING APPARATUS AND METHOD OF MAKING SAME

(71) Applicant: Willert Home Products, Inc., Saint Louis, MO (US)

(72) Inventors: Bryan Bruce Willert, Saint Louis, MO (US); Derek Scranton Winters, Saint Louis, MO (US); Anne Linnea Winn Reilly, Manchester, MO (US); Roy Gene Mayo, Jr., St. Peters, MO (US)

(73) Assignee: Willert Home Products, Inc., Saint Louis, MO (US)

(*) Notice: Subject to any disclaimer, the term of this patent is extended or adjusted under 35 U.S.C. 154(b) by 210 days.

(21) Appl. No.: 14/142,230

(22) Filed: Dec. 27, 2013

(65) Prior Publication Data
US 2015/0181855 A1 Jul. 2, 2015

(51) Int. Cl.
*A01M 1/00* (2006.01)
*A01M 1/02* (2006.01)
*A01M 1/20* (2006.01)

(52) U.S. Cl.
CPC ............ *A01M 1/02* (2013.01); *A01M 1/2005* (2013.01); *A01M 1/2022* (2013.01); *A01M 1/2055* (2013.01); *Y10T 29/49826* (2015.01)

(58) Field of Classification Search
CPC ............ A16L 1/02; A16L 9/012; A16L 9/01; A16L 9/04; A16L 9/048
USPC .................. 239/34, 35, 59, 60, 57
See application file for complete search history.

(56) References Cited

U.S. PATENT DOCUMENTS

| | | | |
|---|---|---|---|
| 187,016 | A | 2/1877 | Johnston |
| 478,691 | A | 7/1892 | De Shon |
| 495,091 | A | 12/1892 | Jenisch |
| 877,309 | A | 1/1908 | Emerson |
| 1,013,514 | A | 1/1912 | Rand |
| 1,056,535 | A | 3/1913 | Grimes et al. |
| 1,477,273 | A | 12/1923 | Liss |
| 1,631,121 | A | 6/1927 | Eckl |
| 1,729,389 | A | 9/1929 | Hughett |
| 1,732,028 | A | 10/1929 | Reiner |
| 1,748,449 | A | 2/1930 | Hughett |
| 1,769,409 | A | 7/1930 | Armstrong |
| 1,780,407 | A | 11/1930 | Smith |

(Continued)

FOREIGN PATENT DOCUMENTS

| | | |
|---|---|---|
| CA | 2227015 A1 | 9/1999 |
| CA | 2538581 C | 6/2013 |

(Continued)

OTHER PUBLICATIONS http://www.wrsweeney.com/animal_repellent_products.php?product=deerrepellent.

*Primary Examiner* — Arthur O Hall
*Assistant Examiner* — Viet Le
(74) *Attorney, Agent, or Firm* — Armstrong Teasdale LLP

(57) ABSTRACT

A scent-releasing apparatus is provided. The scent-releasing apparatus includes a scent-releasing material and a housing having a longitudinal axis and an interior space in which the scent-releasing material is contained. The housing includes a base and a cover coupled to the base so as to receive the base. The cover has an air inlet port and is longitudinally movable on the base between a first position at which the cover forms an air-tight seal of the interior space, and a second position at which the cover permits ambient airflow into the interior space via the air inlet port.

20 Claims, 10 Drawing Sheets

(56) References Cited

U.S. PATENT DOCUMENTS

| | | |
|---|---|---|
| 1,780,408 A | 11/1930 | Smith |
| 1,815,595 A | 7/1931 | Simpson |
| 1,818,684 A | 8/1931 | Blechman |
| 1,902,723 A | 3/1933 | Roberts |
| 1,916,982 A | 7/1933 | Jones |
| 1,921,821 A | 8/1933 | Higgins |
| 1,971,390 A | 8/1934 | Yahres |
| 1,980,754 A | 11/1934 | Henning et al. |
| 2,004,121 A | 6/1935 | Loibl, Jr. |
| 2,086,046 A | 7/1937 | Preston |
| 2,243,752 A | 5/1941 | Dunaway |
| 2,383,960 A | 9/1945 | Dupuy |
| 2,412,326 A | 12/1946 | Dupuy |
| 2,418,878 A | 4/1947 | Harkins |
| 2,510,126 A | 6/1950 | Melcher et al. |
| 2,606,065 A | 8/1952 | Logan et al. |
| 2,629,628 A | 2/1953 | Vaillancourt |
| 2,674,018 A | 4/1954 | Crippen |
| 2,690,030 A | 9/1954 | Thompson |
| 2,733,956 A * | 2/1956 | Wenner ............... F24F 3/16 239/57 |
| 2,734,769 A | 2/1956 | Holz |
| 2,766,066 A | 10/1956 | Hopson et al. |
| 2,825,996 A | 3/1958 | Grant |
| 2,837,861 A | 6/1958 | Graham, Sr. |
| 2,893,160 A | 7/1959 | Grant |
| 2,959,354 A | 11/1960 | Beck |
| 3,046,192 A | 7/1962 | Bilyen |
| 3,134,544 A | 5/1964 | Copley |
| 3,576,088 A | 4/1971 | Arca |
| 3,702,677 A | 11/1972 | Thomas |
| 3,790,081 A | 2/1974 | Thornton et al. |
| 3,799,118 A | 3/1974 | Sandefur |
| 3,826,036 A | 7/1974 | Neugebauer |
| 3,837,574 A | 9/1974 | Curran |
| 3,848,803 A | 11/1974 | Levey |
| 3,896,995 A | 7/1975 | Lelicoff |
| 4,037,353 A | 7/1977 | Hennart et al. |
| 4,065,872 A | 1/1978 | Patton et al. |
| 4,126,958 A | 11/1978 | Yokoyama |
| 4,154,398 A | 5/1979 | Gualandi |
| 4,194,690 A | 3/1980 | Stever et al. |
| 4,214,146 A | 7/1980 | Schimanski |
| 4,277,024 A | 7/1981 | Spector |
| 4,361,279 A | 11/1982 | Beacham |
| 4,374,571 A | 2/1983 | Hirvela |
| 4,441,272 A | 4/1984 | Bartz |
| 4,451,460 A | 5/1984 | Hansen et al. |
| 4,523,717 A | 6/1985 | Schwab |
| 4,534,976 A | 8/1985 | Hansen et al. |
| 4,549,693 A | 10/1985 | Barlics |
| 4,552,307 A | 11/1985 | Stedham |
| 4,657,759 A | 4/1987 | Hansen et al. |
| 4,662,103 A | 5/1987 | Cheng |
| 4,802,626 A | 2/1989 | Forbes et al. |
| 4,804,142 A | 2/1989 | Riley |
| 4,878,615 A | 11/1989 | Losi |
| 4,908,977 A | 3/1990 | Foster |
| 4,917,301 A | 4/1990 | Munteanu |
| 4,969,599 A | 11/1990 | Campbell |
| 4,995,555 A | 2/1991 | Woodruff |
| 4,995,556 A | 2/1991 | Arnold |
| 5,072,849 A | 12/1991 | Blau |
| 5,083,708 A | 1/1992 | Walters |
| 5,150,541 A | 9/1992 | Foster et al. |
| 5,307,584 A | 5/1994 | Jarvis |
| 5,356,881 A | 10/1994 | Verbiscar |
| 5,379,545 A | 1/1995 | Gall et al. |
| D370,247 S | 5/1996 | Shammas |
| 5,544,812 A | 8/1996 | Torres |
| 5,575,992 A | 11/1996 | Kunze |
| 5,738,851 A | 4/1998 | Colavito |
| 5,746,021 A | 5/1998 | Green |
| 5,873,193 A | 2/1999 | Jensen |
| 5,943,815 A | 8/1999 | Paganessi et al. |
| 5,943,816 A | 8/1999 | Hyatt et al. |
| 5,970,643 A | 10/1999 | Gawel |
| 6,061,950 A | 5/2000 | Carey et al. |
| 6,109,539 A | 8/2000 | Joshi et al. |
| 6,192,621 B1 | 2/2001 | Fain |
| 6,241,161 B1 | 6/2001 | Corbett |
| 6,244,518 B1 | 6/2001 | Pogue |
| 6,272,790 B1 | 8/2001 | Paganessi et al. |
| 6,460,487 B1 | 10/2002 | Betzen |
| 6,475,504 B1 | 11/2002 | Stewart |
| 6,648,239 B1 | 11/2003 | Myny et al. |
| 7,048,203 B2 | 5/2006 | Harada et al. |
| 7,051,681 B2 | 5/2006 | Pope |
| 7,147,171 B2 | 12/2006 | Harada et al. |
| 7,325,358 B1 | 2/2008 | Chalupsky et al. |
| 2003/0037476 A1 | 2/2003 | Peavy |
| 2003/0075613 A1* | 4/2003 | Brown ............... A61L 9/12 239/55 |
| 2003/0170180 A1 | 9/2003 | Bahary |
| 2004/0003530 A1 | 1/2004 | Younker |
| 2004/0124254 A1 | 7/2004 | Harada et al. |
| 2004/0228896 A1 | 11/2004 | Harada et al. |
| 2005/0005504 A1 | 1/2005 | Munagavalasa et al. |
| 2005/0089543 A1 | 4/2005 | Weiser |
| 2006/0064925 A1 | 3/2006 | Morgan |
| 2006/0130391 A1 | 6/2006 | Livingston |
| 2006/0137241 A1 | 6/2006 | Yamasaki et al. |
| 2006/0163274 A1 | 7/2006 | Chalupsky |
| 2006/0201054 A1 | 9/2006 | Katsuura et al. |
| 2006/0207163 A1 | 9/2006 | Frokopy |
| 2006/0260183 A1 | 11/2006 | Hockaday |

FOREIGN PATENT DOCUMENTS

| | | |
|---|---|---|
| CH | 603037 A5 | 8/1978 |
| DE | 2264312 A1 | 7/1974 |
| DE | 3939451 A1 | 7/1990 |
| EP | 100730 A1 | 2/1984 |
| EP | 294175 A1 | 12/1988 |
| EP | 1270021 A1 | 1/2003 |
| FR | 2738717 A1 | 3/1997 |
| FR | 2823071 A1 | 10/2002 |
| WO | 9519305 A1 | 7/1995 |

* cited by examiner

SCENT-RELEASING APPARATUS AND METHOD OF MAKING SAME

BACKGROUND OF THE DISCLOSURE

The subject matter described herein relates generally to a scent-releasing apparatus and, more particularly, to a scent-releasing apparatus for use against insects and a method of making the same.

Many known insecticide (or insect repellant) devices are deployed with a scent-releasing agent disposed within a container, and the container is configured to permit the scent to be dispersed into the ambient air surrounding the container. For example, with at least some known devices, contact between the ambient air and the scent-releasing agent causes the scent-releasing agent to gasify (e.g., evaporate, sublimate, etc.), gradually exhausting the scent-releasing agent over time.

These known devices are typically sold to the consumer in a sealed state, preventing the scent from being released (and, therefore, preventing the scent-releasing agent from being exhausted) before the consumer desires to deploy the device. In this manner, the devices are sometimes sealed using a barrier-film wrap that prevents ambient air from contacting the scent-releasing agent until the barrier-film wrap has been removed by the user for deploying the device. However, because the barrier-film wrap is typically destroyed when removed, these known devices are intended for one-time use in that, when unsealed, continuous contact between the ambient air and the scent-releasing agent is permitted until the scent-releasing agent has been completely exhausted. In other words, these devices are not typically provided with a mechanism that facilitates resealing the device prior to complete exhaustion of the scent-releasing agent to preserve the remainder of the scent-releasing agent for future use.

It would be useful, therefore, to provide a scent-releasing device for use against insects and/or other animals that is resealable after an initial deployment to preserve unused scent-releasing agent for a future deployment.

BRIEF DESCRIPTION OF THE DISCLOSURE

In one aspect, a scent-releasing apparatus is provided. The scent-releasing apparatus includes a scent-releasing material and a housing having a longitudinal axis and an interior space in which the scent-releasing material is contained. The housing includes a base and a cover coupled to the base so as to receive the base. The cover has an air inlet port and is longitudinally movable on the base between a first position at which the cover forms an air-tight seal of the interior space, and a second position at which the cover permits ambient airflow into the interior space via the air inlet port.

In another aspect, a housing for a scent-releasing apparatus is provided. The housing has a longitudinal axis and an interior space for containing a scent-releasing material. The housing includes a base and a cover having an air inlet port. The cover is configured to be coupled to the base so as to receive the base. The cover is longitudinally movable when coupled to the base between a first position at which the cover forms an air-tight seal of the interior space, and a second position at which the cover permits ambient airflow into the interior space via the air inlet port.

In another aspect, a method of making a scent-releasing apparatus is provided. The method includes providing a housing having a longitudinal axis and an interior space. The housing includes a base and a cover configured to be coupled to the base so as to receive the base, and the cover has an air inlet port. The method also includes inserting a scent-releasing material into the housing for containment within the interior space. The method further includes coupling the cover to the base for longitudinal movement of the cover on the base between a first position at which the cover forms an air-tight seal of the interior space, and a second position at which the cover permits ambient airflow into the interior space via the air inlet port.

DETAILED DESCRIPTION OF THE DISCLOSURE

The exemplary embodiments described herein provide a scent-releasing apparatus that is useful for killing insects such as moths, but could be used against other types of insects and/or animals. The scent-releasing apparatus includes a housing having a base and a cover coupled to the base. The housing contains a naphthalene material (or other suitable scent-releasing material such as, for example, a paradichlorobenzene material) in an interior space of the base, and the naphthalene sublimes at room temperature to release a scent into the ambient air surrounding the apparatus for killing moths. The cover is telescopically movable on the base between a sealed state (in which the cover is lowered on the base and is engaged with a foot of the base to provide an air-tight seal for the interior space) and a deployed state (in which the cover is raised on the base and is disengaged from the foot of the base to permit airflow through the interior space). As used herein, the term "air-tight" refers to preventing a substantial amount of ambient airflow into the interior space of the housing, thereby inhibiting the ambient air from contacting the scent-releasing material (e.g., the naphthalene). Although the example embodiment described herein includes naphthalene as the scent-releasing material, other materials could be used and still be within the scope of this disclosure.

In the sealed state, the cover maintains an airtight seal of the interior space, thereby preserving the supply of scent-releasing material by inhibiting premature sublimation until the user desires to deploy the apparatus. When in the deployed state, the cover permits airflow through the interior space, causing the naphthalene to sublime and gradually diminish in supply as a result. Thus, the cover facilitates regulating airflow into the interior space by enabling the user to selectively start and stop the sublimation process as desired. The apparatus can therefore be deployed more than once using the original supply of scent-releasing material (i.e., the resealable nature of the apparatus enables the apparatus to be initially deployed, then sealed again, and then deployed again). As such, the apparatus enables a controlled (or modulated) use of the scent-releasing material. Moreover, the user is able to deploy, reseal, and redeploy the apparatus without touching the scent-releasing material.

Upon deployment, the apparatus can be mounted in any suitable location to prevent moths from eating clothing or other fabric. Specifically, the apparatus includes a manually deformable wire that can be bent into any desired shape to optionally support the housing from underneath (via insertion of the wire into a slot accessible on an underside of the housing) or suspend the housing from above (via insertion of the wire into a hanger provided on a topside of the housing).

Figure 1:
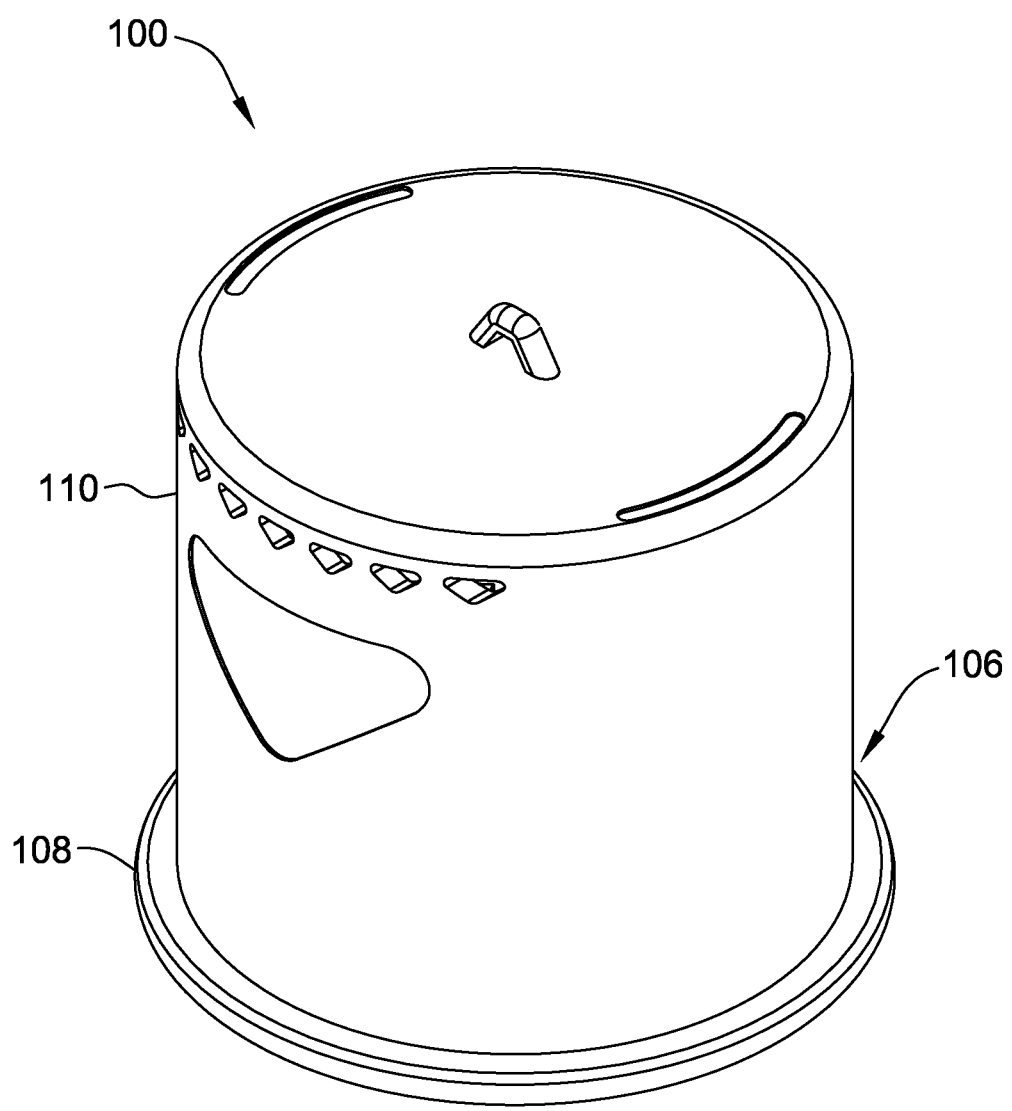
FIG. 1 is a perspective view of a scent-releasing apparatus.
Figure 2:
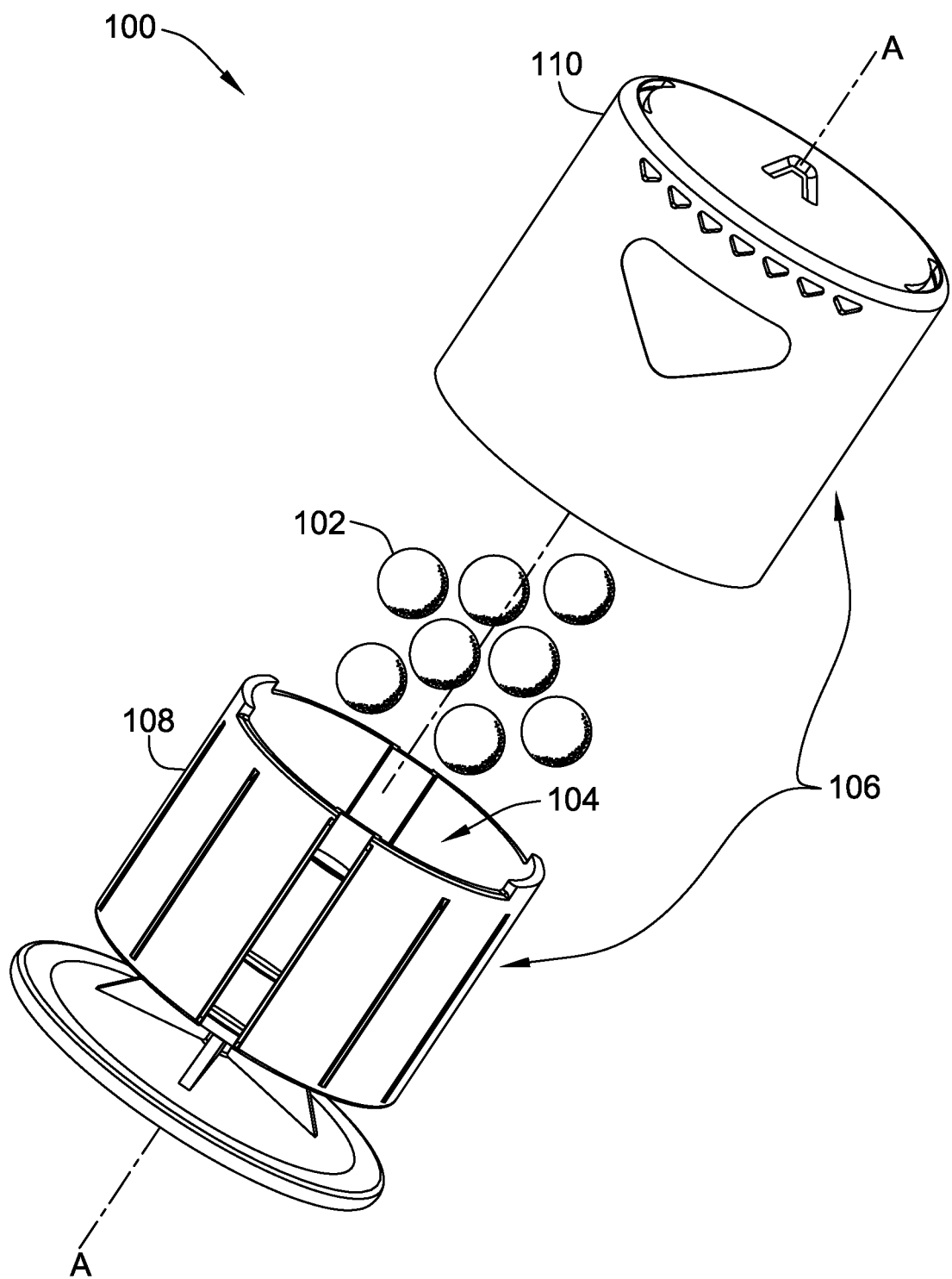
FIG. 2 is an exploded view of the scent-releasing apparatus shown in FIG. 1.

FIG. 1 is a perspective view of an exemplary scent-releasing apparatus 100, and FIG. 2 is an exploded view of scent-releasing apparatus 100. Scent-releasing apparatus 100 includes a scent-releasing material 102 disposed within an interior space 104 of a housing 106 having a base 108 and a cover 110. In the exemplary embodiment, scent-releasing material 102 is a naphthalene material that sublimes in ambient air at room temperature to release a scent that kills moths, and scent-releasing material 102 is provided in the form of a plurality of generally spherical cakes. In other embodiments, scent-releasing material 102 may be any suitable material having any suitable shape (e.g., the cakes may be generally cubic, rather than being generally spherical). As used herein, the term "scent" refers to any airborne matter usable for a purpose such as deodorizing, repelling, or exterminating. Thus, a "scent" may have an odor in some embodiments and may be odorless in other embodiments.

Figure 3:
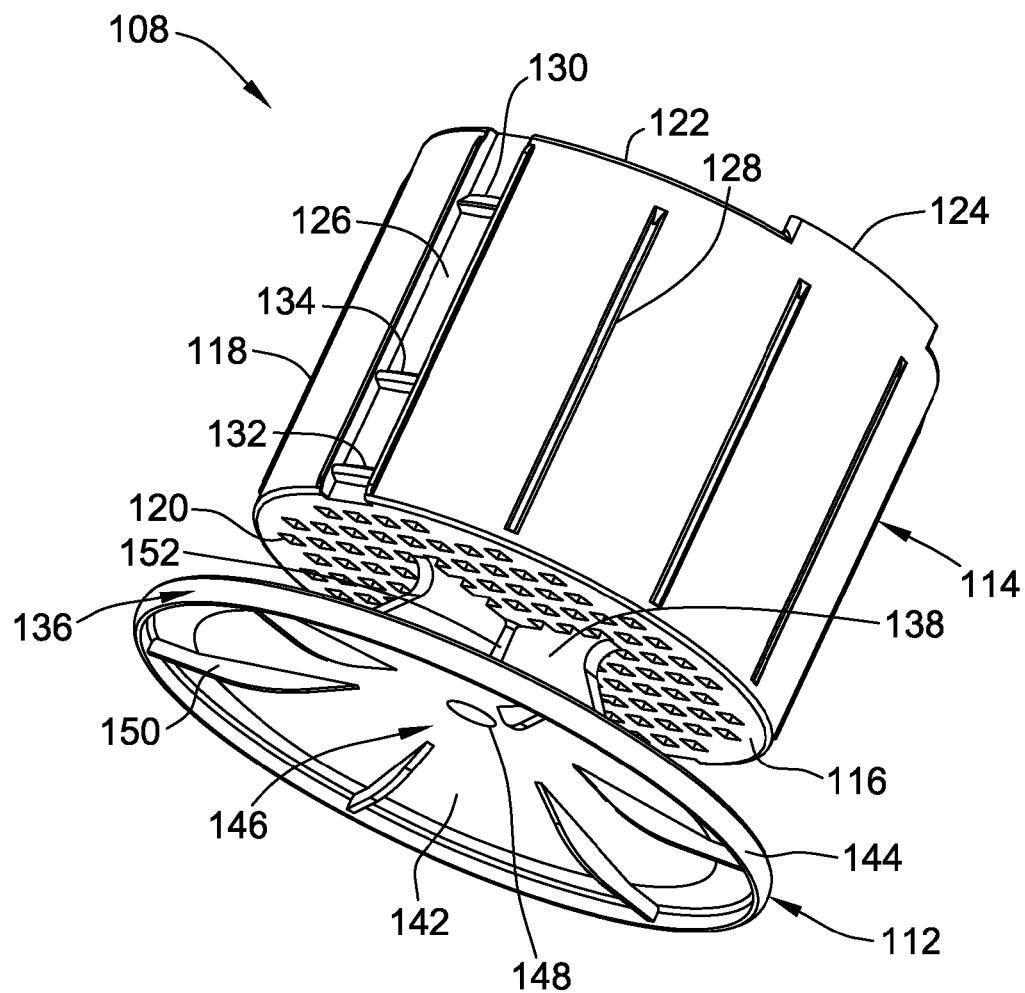
FIG. 3 is a perspective view of a base of the scent-releasing apparatus shown in FIG. 2.
Figure 4:
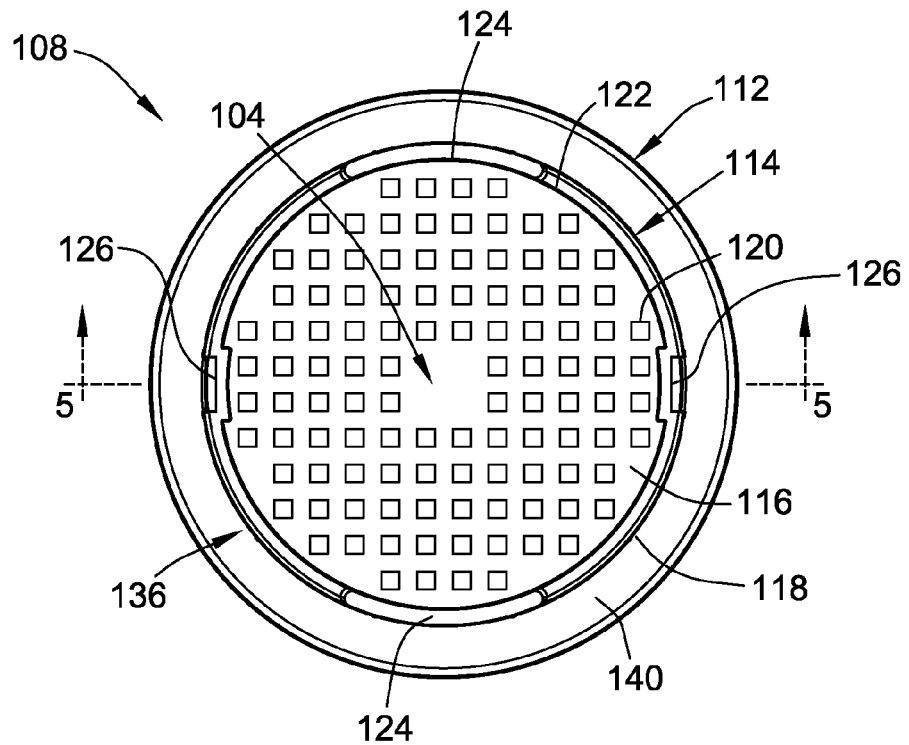
FIG. 4 is a top view of the base shown in FIG. 3.
Figure 5:
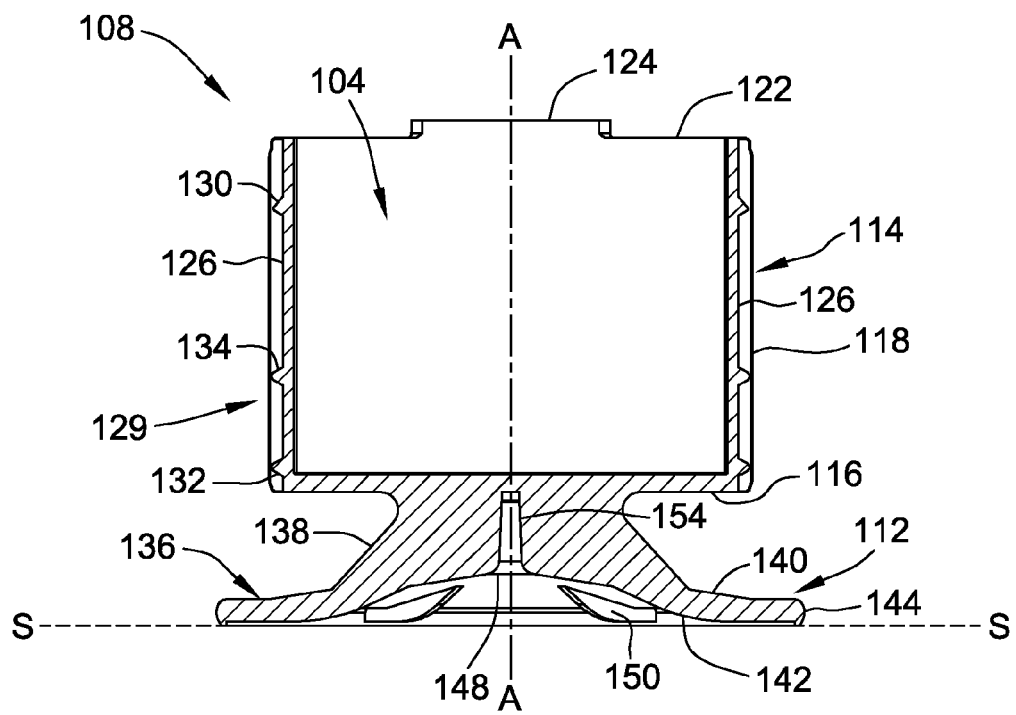
FIG. 5 is a cross-sectional view of the base shown in FIG. 3 and taken along plane 5-5 of FIG. 4.

FIGS. 3-5 are a perspective, top, and cross-sectional views respectively of base 108. In the exemplary embodiment, base 108 has a longitudinal axis A and includes a stand 112 and a cup 114 atop of stand 112. Base 108 is fabricated from a synthetic or semi-synthetic, organic-based material (e.g., a "plastic" material) using a molding process such that cup 114 and stand 112 are integrally formed together. It is understood, however, that other embodiments of base 108 may be fabricated from any suitable material using any suitable manufacturing process (e.g., cup 114 may be fabricated separately from, and subsequently coupled to, stand 112 using a suitable fastener or bonding agent).

In one embodiment, housing 106 is configured to be mounted with stand 112 seated on a support surface S (shown schematically in FIG. 5) such that longitudinal axis A is substantially perpendicular to support surface S. As used herein, terms such as "up," "top," "over," and variations thereof are relative directional modifiers intended to indicate locations farther away from support surface S along longitudinal axis A than locations indicated by terms such as "down," "bottom," "under," and variations thereof Moreover, as used herein, terms such as "radial," "diametric," and variations thereof are relative directional modifiers intended to indicate directions that are substantially perpendicular to longitudinal axis A (i.e., longitudinal axis A is the center of an imaginary cylinder having a radius and a diameter).

In the exemplary embodiment, cup 114 has a bottom wall 116 and an annular side wall 118. Bottom wall 116 has a plurality of outlet ports 120 and is oriented substantially perpendicular to longitudinal axis A, and side wall 118 projects upward from bottom wall 116 so as to be oriented substantially parallel with longitudinal axis A. In this manner, bottom wall 116 and side wall 118 collectively define interior space 104. Side wall 118 has a rim 122 and a pair of generally diametrically-opposed, arcuately-shaped tabs 124 projecting from rim 122. Side wall 118 also has on its exterior a pair of generally diametrically-opposed, longitudinally-extending channels 126 and a plurality of circumferentially-spaced, longitudinally-extending ribs 128. Each channel 126 is interrupted by a set 129 of longitudinally-arranged external detents, namely an upper external detent 130 near rim 122, a lower external detent 132 near bottom wall 116, and an intermediate external detent 134 situated longitudinally between upper external detent 130 and lower external detent 132. Suitably, other embodiments of side wall 118 may have any number of tabs, ribs, channels, and detents that facilitates enabling base 108 to function as described herein.

In the exemplary embodiment, stand 112 includes a generally disc-shaped foot 136 and a plurality of legs 138 joining foot 136 to bottom wall 116 of cup 114 so as to support cup 114 on foot 136. Foot 136 has a top surface 140, a bottom surface 142, and a peripheral surface 144. Bottom surface 142 is recessed and has a central region 146 in which an aperture 148 is defined. Bottom surface 142 also has a plurality of circumferentially-spaced supports 150 oriented generally radially outward from central region 146. Legs 138 are arranged in a generally star-shaped array so as to project generally radially outward from a central post 152. A tubular slot 154 is defined within post 152, and slot 154 is in communication with aperture 148 of bottom surface 142 so as to permit access to slot 154 via aperture 148. In other embodiments, stand 112 may have any suitable number of feet coupled to cup 114 via any suitable number of legs. Moreover, the feet and the leg(s) may have any suitable size/shape and may be arranged in any suitable manner that facilitates enabling stand 112 to function as described herein.

Figure 6:
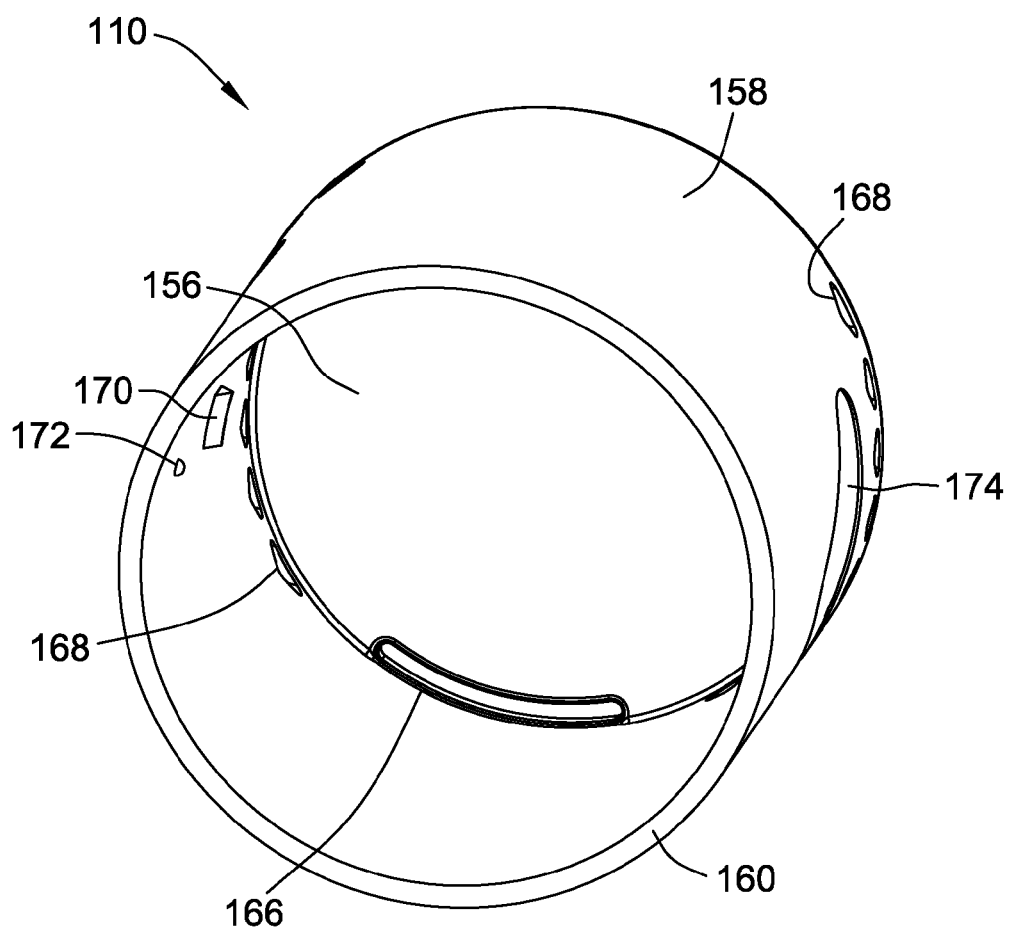
FIG. 6 is a perspective view of a cover of the scent-releasing apparatus shown in FIG. 2.
Figure 7:
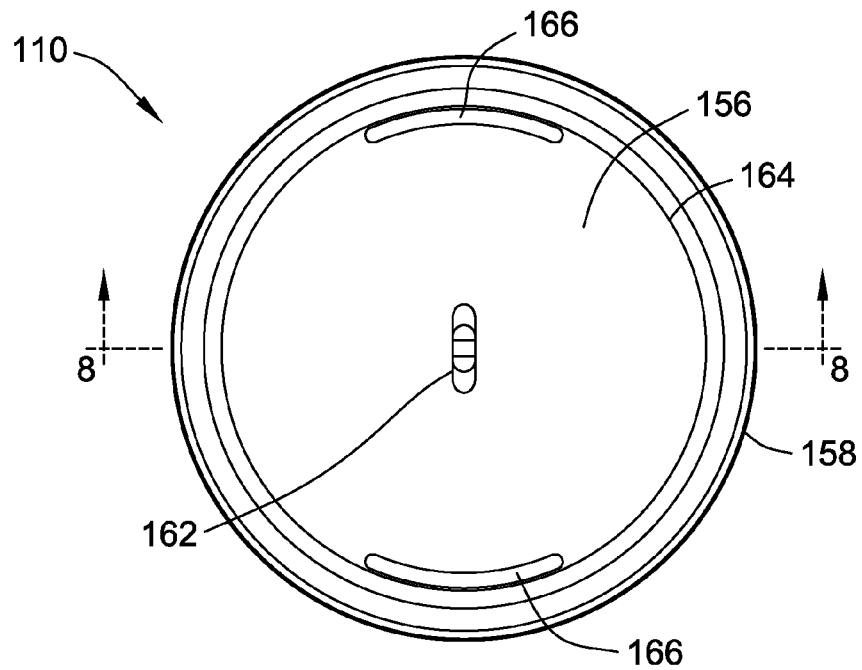
FIG. 7 is a top view of the cover shown in FIG. 6.
Figure 8:
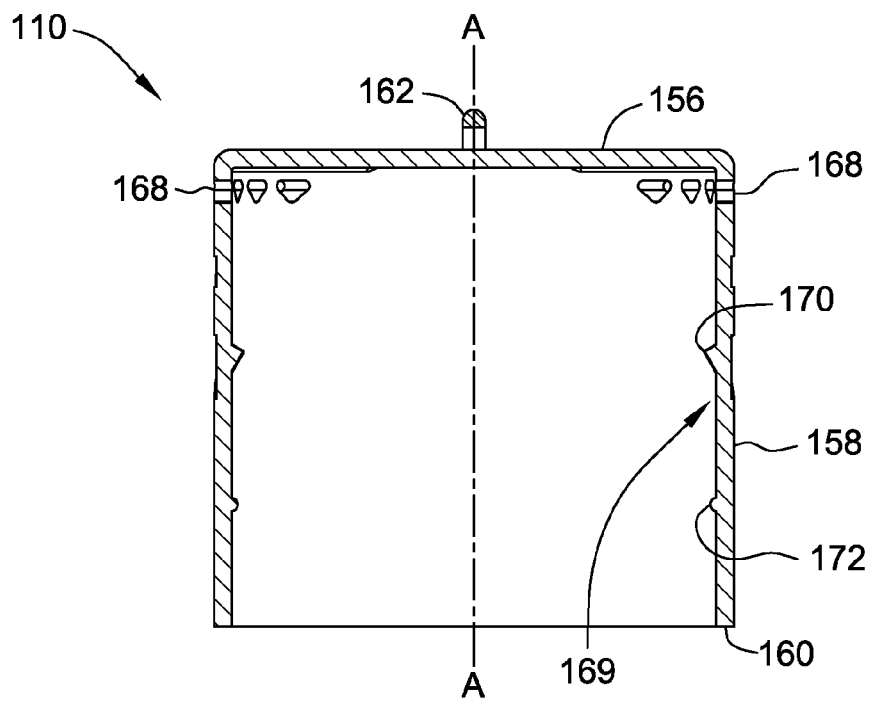
FIG. 8 is a cross-sectional view of the cover shown in FIG. 6 and taken along plane 8-8 of FIG. 7.

FIGS. 6-8 are perspective, top, and cross-sectional views respectively of cover 110. In the exemplary embodiment, cover 110 has a top wall 156 and a side wall 158 extending downward from top wall 156 to a bottom edge 160. Top wall 156 is generally disc-shaped and has a closed-loop hanger 162 projecting therefrom. Moreover, top wall 156 has a perimeter 164 at which it is joined with side wall 158, and top wall 156 also has a pair of generally diametrically-opposed, arcuately-shaped slits 166 that are situated near perimeter 164. Each slit 166 is sized to receive one tab 124 of base 108 as set forth in more detail below.

Side wall 158 is generally cylindrical and is sized to receive cup 114. Side wall 158 includes a plurality of circumferentially-spaced inlet ports 168 disposed near top wall 156. Side wall 158 also includes generally diametrically-opposed pairs 169 of longitudinally-arranged internal detents, namely an upper internal detent 170 and a lower internal detent 172. In other embodiments, top wall 156 and side wall 158 may have any suitable shapes. Moreover, in some embodiments, top wall 156 may have any suitable number of slits (or other formations) arranged in any suitable manner that facilitates enabling cover 110 to function as described herein. Likewise, side wall 158 may have any suitable number of detents arranged in any suitable manner that facilitates enabling cover 110 to function as described herein. Optionally, side wall 158 may also have an indented region 174 designated for adhesively securing a label to cover 110 or otherwise branding cover 110 as desired.

Referring again to FIGS. 5 and 8, each set 129 of longitudinally-arranged external detents 130, 132, 134 of base 108 is configured to interact with one pair 169 of longitudinally-arranged internal detents 170, 172 of cover 110 to provide a position-retention mechanism for cover 110 on base 108 as set forth in more detail below. In the exemplary embodiment, each upper external detent 130 of base 108 has a generally triangular cross-sectional profile, and each upper internal detent 170 of cover 110 also has a generally triangular cross-sectional profile. In other embodiments, upper external detents 130 and upper internal detents 170 may have a cusped (i.e., pointed or not rounded) cross-sectional profile other than a generally triangular cross-sectional profile such as, for example, a generally square cross-sectional profile. Alternatively, upper external detents 130 and upper internal detents 170 may have any suitable cross-sectional profiles that facilitate enabling housing 106 to function as described herein. Moreover, in the exemplary embodiment, each lower external detent 132, each intermediate external detent 134, and each lower internal detent 172 has a rounded cross-sectional profile. However, in other embodiments, the various detents of housing 106 may have any suitable cross-sectional profiles that facilitate enabling the position-retention function of housing 106 described herein.

Figure 9:
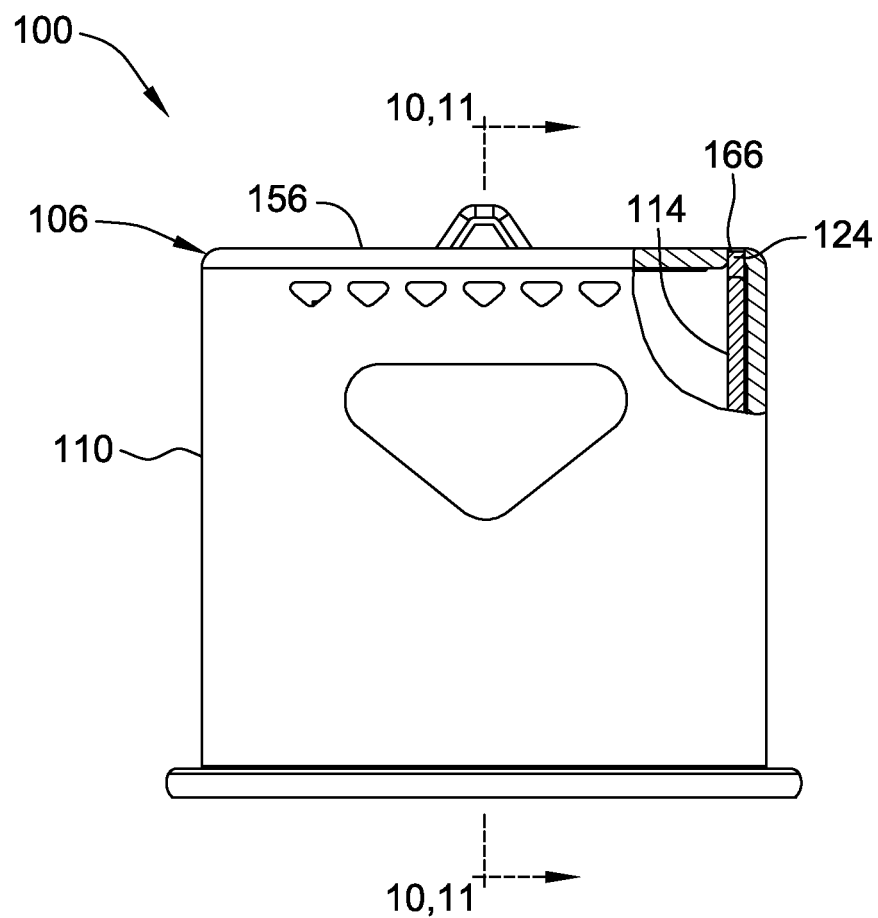
FIG. 9 is a partially cut-out view of the scent-releasing apparatus shown in FIG. 1 in a sealed state.
Figure 10:
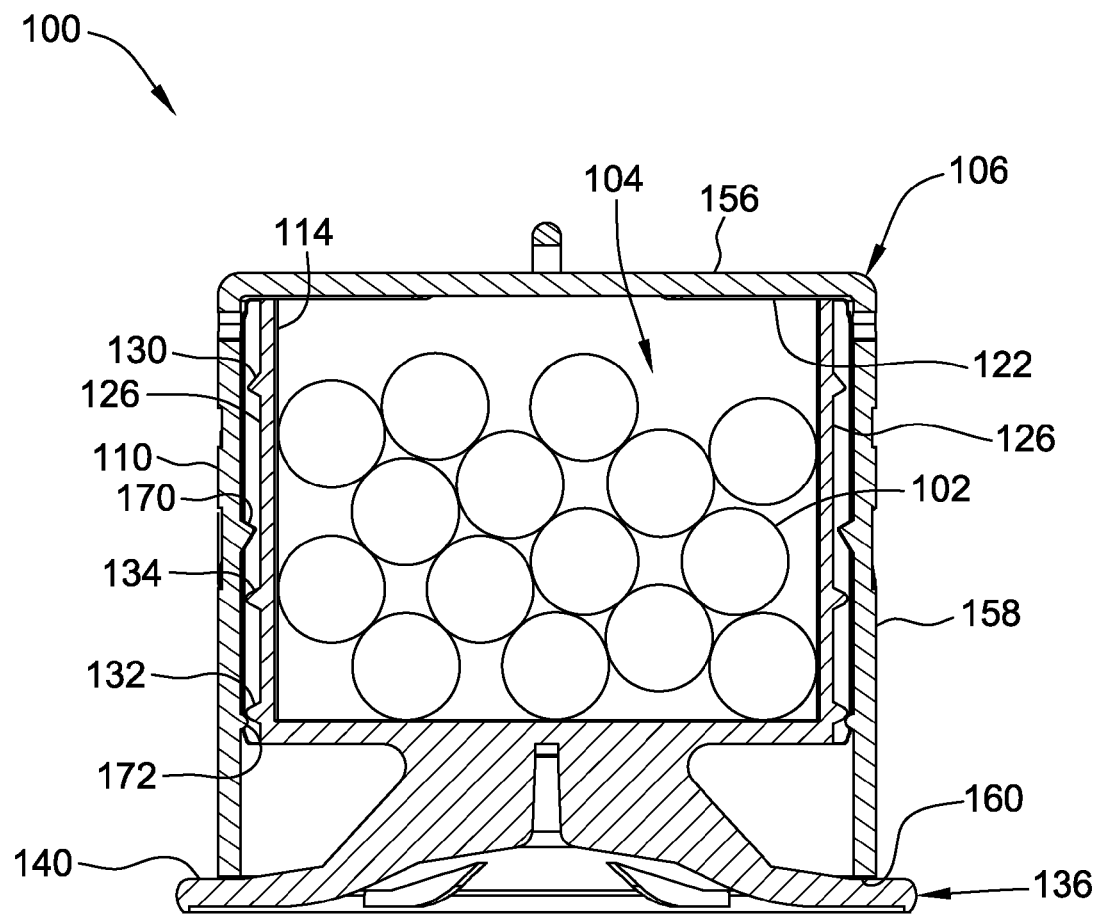
FIG. 10 is a cross-sectional view of the scent-releasing apparatus shown in FIG. 9 and taken along plane 10-10 of FIG. 9.

FIGS. 9 and 10 are partially cut-out and cross-sectional views respectively of scent-releasing apparatus 100 in a sealed state. In the exemplary embodiment, cover 110 is in a lowered (or first) position relative to cup 114 such that bottom edge 160 of side wall 158 is seated on top surface 140 of foot 136. Additionally, each tab 124 of cup 114 is inserted into one of slits 166 such that top wall 156 of cover 110 is seated on (or is situated closely adjacent to) rim 122 of cup 114. In this manner, cover 110 completely encloses interior space 104 to provide an air-tight seal of interior space 104, thereby sealing scent-releasing material 102 within interior space 104. Such an air-tight seal inhibits ambient airflow through interior space 104, and scent-releasing material 102 is therefore inhibited from releasing a scent into the ambient air surrounding housing 106. Notably, in the sealed state, each upper internal detent 170 extends into one respective channel 126 between the associated upper external detent 130 and intermediate external detent 134, and each lower internal detent 172 extends into the respective channel 126 below (and in contact with) the associated lower external detent 132. Because lower internal detents 172 are in contact with lower external detents 132, upward displacement of cover 110 is inhibited, and cover 110 is therefore held (or retained) in the lowered position, at which position scent-releasing apparatus 100 is said to be in its sealed state. In alternative embodiments, bottom edge 160 of cover 110 may have a plurality of tabs resembling tabs 124 on rim 122, and foot 136 may have a plurality of corresponding slits resembling slits 166 of cover 110. In such embodiments, the tabs on bottom edge 160 would be insertable into the slits of foot 136 so as to improve the connection between cover 110 and base 108 when scent-releasing apparatus 100 is in the sealed state.

In the exemplary embodiment, scent-releasing apparatus 100 will likely be provided to the user in its sealed state (with scent-releasing material 102 disposed within interior space 104), and housing 106 will likely be wrapped in a film so as to ensure that ambient air is prevented from entering interior space 104 of housing 106 when scent-releasing apparatus 100 is being stored and/or shipped in advance of being initially deployed by the user. More specifically, the film will minimize the chance for premature exhaustion of scent-releasing material 102 and ensure that scent-releasing apparatus 100 has nearly its entire production weight of scent-releasing material 102 when initially deployed by the user. As used herein, the term "initially deployed" (and variations thereof) refers to the first instance that a given scent-releasing apparatus 100 is deployed by a user.

Figure 11:
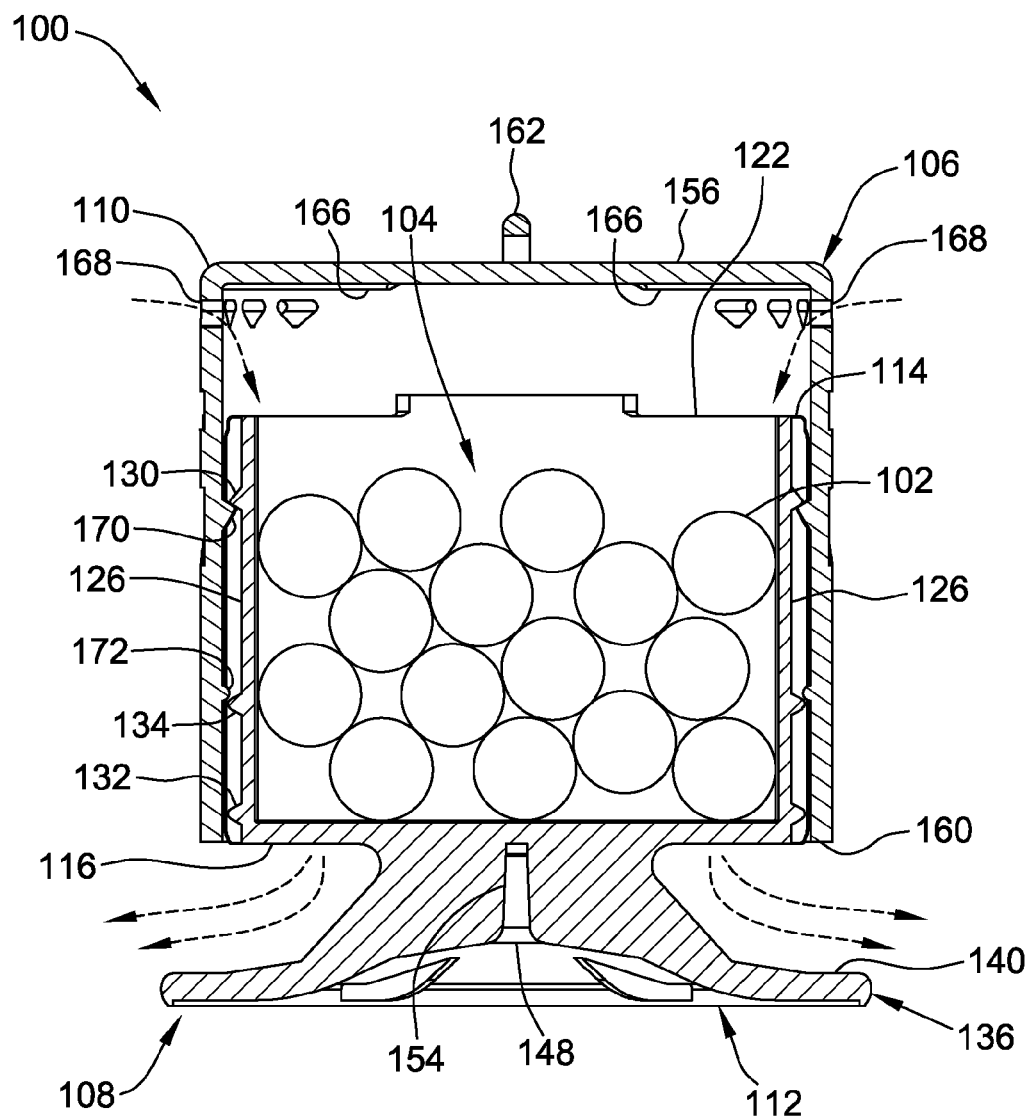
FIG. 11 is a cross-sectional view of the scent-releasing apparatus shown in FIG. 1 in a deployed state and taken along plane 11-11 of FIG. 9.

FIG. 11 is a cross-sectional view of scent-releasing apparatus 100 in a deployed state. To initially deploy scent-releasing apparatus 100, the user would first remove housing 106 from any film within which housing 106 may have been wrapped. Then, the user manually imparts an upward force on cover 110 (e.g., by pulling cover 110 upward). When adequate upward manual force is imparted on cover 110, lower internal detents 172 traverse lower external detents 132 within channels 126 due in part to lower internal detents 172 and lower external detents 132 having rounded cross-sectional profiles. Once lower internal detents 172 traverse lower external detents 132, top wall 156 of cover 110 begins to separate from rim 122 of cup 114, and bottom edge 160 of cover 110 begins to separate from top surface 140 of foot 136, thereby breaking the air-tight seal of interior space 104 and enabling ambient airflow through interior space 104 as set forth in more detail below. As cover 110 travels upward along base 108 in a telescopic manner, lower internal detents 172 continue to travel upward within their respective channels 126. Top wall 156 continues to separate from rim 122, and bottom edge 160 continues to separate from foot 136. Notably, ribs 128 (shown in FIG. 3) function as spacers that facilitate a smooth sliding motion of cover 110 along base 108.

During their upward travel and due in part to their rounded cross-sectional profiles, lower internal detents 172 next traverse intermediate external detents 134 if sufficient upward manual force continues to be imparted on cover 110. After lower internal detents 172 traverse intermediate external detents 134, upper internal detents 170 encounter upper external detents 130. However, due in part to upper internal detents 170 and upper external detents 130 having generally triangular cross-sectional profiles, upper internal detents 170 are unable to traverse upper external detents 130, providing a limit-stop that halts the upward travel of cover 110 along base 108. When the upward travel of cover 110 is halted, upper internal detents 170 are positioned below (and in contact with) upper external detents 130, and lower internal detents 172 are positioned above (and in contact with) intermediate external detents 134. Continued upward displacement of cover 110 is thereby prevented, and downward displacement of cover 110 is thereby inhibited. In this manner, cover 110 is held (or retained) in a raised (or second) position at which scent-releasing apparatus 100 is said to be in its deployed state. Notably, because upper internal detents 170 are in contact with upper external detents 130, and because lower internal detents 172 are in contact with intermediate external detents 134, cover 110 is stabilized in the raised position (i.e., cover 110 is held in the raised position substantially without longitudinal play).

In the deployed state, ambient air is permitted to flow into interior space 104 through inlet ports 168 and slits 166 because rim 122 of cup 114 is disposed below inlet ports 168 and slits 166. The air entering interior space 104 flows downward through spaces between the generally spherical cakes of scent-releasing material 102 and exits interior space 104 via outlet ports 120 (shown in FIGS. 3 and 4) of bottom wall 116 so as to then be directed generally radially outward between bottom wall 116 of cup 114 and foot 136 of stand 112. As the air contacts scent-releasing material 102, scent-releasing material 102 gasifies (e.g., sublimes in the exemplary embodiment) or otherwise releases an insect-killing (or repelling) scent that likewise flows out of interior space 104 via outlet ports 120. Notably, in the lowered position, the raised position, and the continuum of positions between the raised position and the lowered position, scent-releasing material 102 is completely contained within housing 106 such that scent-releasing material 102 is not exposed for contact by the user.

Figure 12:
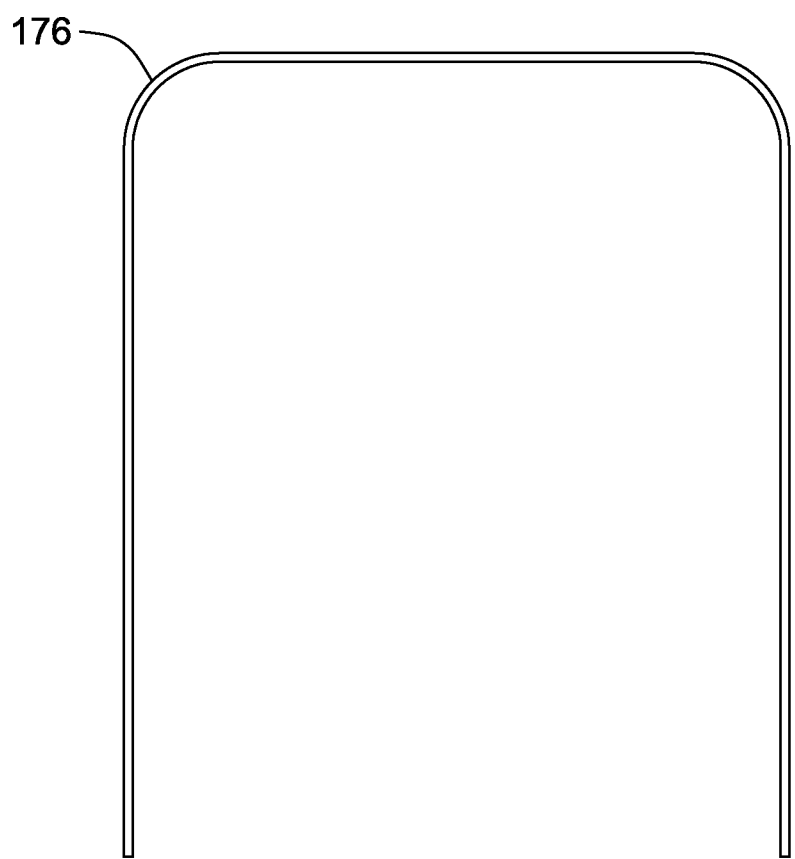
FIG. 12 is a side view of a wire for use in mounting the scent-releasing apparatus shown in FIG. 1.

After having been deployed, scent-releasing apparatus 100 can be seated on any suitable support surface S via foot 136 (as shown schematically in FIG. 5). Alternatively, scent-releasing apparatus 100 may be provided with a wire 176 (shown in FIG. 12) that is manually deformable (or bendable) into any suitable shape that facilitates mounting deployed scent-releasing apparatus 100 in a desired location. It should however be noted that, even after having been manually deformed, wire 176 maintains structural properties sufficient to, for example, suspend deployed scent-releasing apparatus 100 from above (by inserting wire 176 into hanger 162) or support deployed scent-releasing apparatus 100 from below (by inserting wire 176 into slot 154 of stand 112 via aperture 148 of foot 136).

When the user has finished deploying scent-releasing apparatus 100, the user may then reseal scent-releasing apparatus 100 for future use if some scent-releasing material 102 remains within interior space 104. Specifically, the user may simply impart a downward manual force to cover 110 (e.g., by pushing cover 110 downward) such that lower internal detents 172 traverse intermediate external detents 134 and lower external detents 132, essentially reversing the deployment procedure. Bottom edge 160 of cover 110 again comes into air-tight, sealing contact with top surface 140 of foot 136, and rim 122 again comes into air-tight, sealing contact with (or is situated closely adjacent to) top wall 156 such that tabs 124 are again inserted into slits 166 of top wall 156. In this manner, scent-releasing apparatus 100 again assumes the sealed state and can be stored in the sealed state until redeployment is desired by the user. As such, scent-releasing apparatus 100 is configured to be reusable in that scent-releasing apparatus 100 can be initially deployed, then resealed, and then deployed again. Any desired number of redeployments is possible for any desired lengths of time until scent-releasing material 102 has been completely exhausted. Thus, a single supply of scent-releasing material 102 is usable in increments, thereby enabling more efficient use of scent-releasing apparatus 100 by the user. Moreover, the user is able to deploy, reseal, and redeploy scent-releasing apparatus 100 without touching scent-releasing material 102.

It should further be noted that, rather than being telescopically slidable upward and downward by virtue of channels 126 and detents 130, 132, 134, 170, 172 as set forth above, alternative embodiments of housing 106 may be configured to permit upward and downward movement of cover 110 relative to base 108 by virtue of a threaded engagement between cover 110 and base 108 (e.g., the resealable functions achieved by the manual push/pull-type actions set forth above may instead be achieved by rotating-type actions). For example, clockwise rotation of cover 110 relative to base 108 could cause a downward movement of cover 110 on base 108, and counterclockwise rotation of cover 110 relative to base 108 could cause an upward movement of cover 110 on base 108.

The methods and systems described herein therefore facilitate providing a scent-releasing apparatus that can be easily deployed by simply imparting a manual force on a cover so as to raise the cover on a base. Also, the methods and systems described herein facilitate providing a scent-releasing apparatus that can be easily resealed after deployment by simply imparting a manual force on a cover so as to lower the cover on a base. As such, the methods and systems described herein facilitate providing a scent-releasing apparatus that can be deployed more than once using the original supply of scent-releasing material (i.e., the resealable nature of the apparatus enables an apparatus to be initially deployed, then sealed again, and then deployed again).

Exemplary embodiments of a scent-releasing apparatus are described above in detail. The scent-releasing apparatus described herein is not limited to the specific embodiments described herein, but rather, components of the apparatus may be utilized independently and separately from one another. For example, the apparatus described herein may have other applications not limited to practice with insecticides or insect repellants, as described herein. Rather, the apparatus described herein can be implemented and utilized in connection with various other industries.

This written description uses example embodiments, while disclosing the best mode and enabling any person skilled in the art to practice the example embodiments, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A scent-releasing apparatus comprising:
a scent-releasing material; and
a housing having a longitudinal axis and an interior space in which said scent-releasing material is contained, said housing comprising a base and a cover coupled to said base, wherein said base comprises a cup for receiving said scent-releasing material, a stand for supporting said cup, and an air outlet port, and wherein said cover comprises an air inlet port and an opening that receives said base, said cover longitudinally movable on said base between a first position at which said cover forms an air-tight seal of the interior space, and a second position at which said cover permits ambient airflow into the interior space via said air inlet port and out of the interior space via said air outlet port.

2. A scent-releasing apparatus in accordance with claim 1, wherein said scent-releasing material is one of a naphthalene material and a paradichlorobenzene material.

3. A scent-releasing apparatus in accordance with claim 1, wherein said cover is telescopically slidable along said base.

4. A scent-releasing apparatus in accordance with claim 3, wherein said base comprises a plurality of external detents, and wherein said cover comprises a plurality of internal detents that interact with said external detents to retain said cover in the first position and the second position.

5. A scent-releasing apparatus in accordance with claim 1, wherein said cover contacts said base in the first position to form the air-tight seal of the interior space.

6. A scent-releasing apparatus in accordance with claim 5, wherein said cover contacts said stand in the first position to facilitate the air-tight seal of the interior space.

7. A scent-releasing apparatus in accordance with claim 1, wherein said cup comprises a bottom wall and a side wall projecting from said bottom wall, said bottom wall defining said air outlet port through which the ambient airflow exits the interior space.

8. A housing for a scent-releasing apparatus, said housing having a longitudinal axis and an interior space for containing a scent-releasing material, said housing comprising:
- a base comprising a cup for receiving the scent-releasing material, a stand for supporting said cup, and an air outlet port; and
- a cover comprising an air inlet port and an opening, wherein said cover couples to said base so as to receive said base in said opening, wherein said cover is longitudinally movable when coupled to said base between a first position at which said cover forms an air-tight seal of the interior space, and a second position at which said cover permits ambient airflow into the interior space via said air inlet port and out of the interior space via said air outlet port.

9. A housing in accordance with claim 8, wherein said cover is telescopically slidable along said base.

10. A housing in accordance with claim 9, wherein said base comprises a plurality of external detents, and wherein said cover comprises a plurality of internal detents that interact with said external detents to retain said cover in the first position and the second position.

11. A housing in accordance with claim 8, wherein said cover contacts said base in the first position to form the air-tight seal of the interior space.

12. A housing in accordance with claim 11, wherein said cover contacts said stand in the first position to facilitate the air-tight seal of the interior space.

13. A housing in accordance with claim 8, wherein said cup comprises a bottom wall and a side wall projecting from said bottom wall, said bottom wall defining said air outlet port through which the ambient airflow exits the interior space.

14. A housing in accordance with claim 8, wherein said cover comprises a slit, said base comprising a tab sized for insertion into said slit of said cover in the first position.

15. A method of making a scent-releasing apparatus, said method comprising:
- providing a housing having a longitudinal axis and an interior space, the housing includes a base and a cover, wherein the base has a cup for receiving a scent-releasing material, a stand for supporting the cup, and an air outlet port, and wherein the cover has an air inlet port and an opening for receiving the base;
- inserting the scent-releasing material into the cup of the housing for containment within the interior space; and
- coupling the cover to the base for longitudinal movement of the cover on the base between a first position at which the cover forms an air-tight seal of the interior space, and a second position at which the cover permits ambient airflow into the interior space via the air inlet port and out of the interior space via the air outlet port.

16. A method in accordance with claim 15, further comprising providing the scent-releasing material as one of a naphthalene material and a paradichlorobenzene material.

17. A method in accordance with claim 15, further comprising coupling the cover to the base for telescopic sliding movement of the cover along the base.

18. A method in accordance with claim 17, further comprising inserting a plurality of internal detents of the cover into a channel of the base for interaction with a plurality of external detents disposed within the channel of the base to retain the cover in the first position and the second position.

19. A method in accordance with claim 15, further comprising seating the cover in sealing contact with the base in the first position.

20. A method in accordance with claim 15, further comprising:
- providing the cup with a bottom wall that defines the air outlet port; and
- seating the scent-releasing material on the bottom wall of the cup to permit the ambient airflow to exit the interior space via the air outlet port.

* * * * *